(12) United States Patent
Aoyama

(10) Patent No.: US 6,992,465 B2
(45) Date of Patent: Jan. 31, 2006

(54) GENERATOR CONTROL CIRCUIT HAVING ALARM CONTROLLER

(75) Inventor: Toru Aoyama, Okazaki (JP)

(73) Assignee: Denso Corporation, Kariya (JP)

(*) Notice: Subject to any disclaimer, the term of this patent is extended or adjusted under 35 U.S.C. 154(b) by 127 days.

(21) Appl. No.: 10/729,016

(22) Filed: Dec. 8, 2003

(65) Prior Publication Data

US 2004/0113593 A1 Jun. 17, 2004

(30) Foreign Application Priority Data

Dec. 10, 2002 (JP) ............................ 2002-357468
Sep. 1, 2003 (JP) ............................ 2003-308231

(51) Int. Cl.
  *H02J 7/14* (2006.01)
  *H02J 7/16* (2006.01)
  *H02P 9/00* (2006.01)
  *H02P 9/30* (2006.01)
  *H02H 7/06* (2006.01)

(52) U.S. Cl. .......................................... 322/28; 322/32
(58) Field of Classification Search ................. 322/28, 322/32

See application file for complete search history.

(56) References Cited

U.S. PATENT DOCUMENTS

| | | | | |
|---|---|---|---|---|
| 4,412,169 A * | 10/1983 | Dell'Orto | .................... | 320/123 |
| 4,618,811 A * | 10/1986 | Mashino et al. | ............... | 322/28 |
| 4,755,734 A * | 7/1988 | Komurasaki et al. | ......... | 322/28 |
| 4,755,737 A * | 7/1988 | Komurasaki et al. | .......... | 322/99 |
| 4,973,896 A * | 11/1990 | Shiga et al. | .................... | 322/28 |
| 5,059,886 A * | 10/1991 | Nishimura et al. | ........... | 322/28 |
| 5,061,889 A * | 10/1991 | Iwatani et al. | ................. | 322/28 |
| 5,089,766 A * | 2/1992 | Iwatani | ......................... | 322/25 |
| 5,298,851 A * | 3/1994 | DeNardis | ...................... | 322/28 |
| 5,510,695 A * | 4/1996 | Tanaka et al. | ................. | 322/25 |
| 5,528,148 A * | 6/1996 | Rogers | ........................ | 320/137 |
| 5,545,930 A * | 8/1996 | Watanabe et al. | ........... | 307/10.1 |
| 5,629,606 A * | 5/1997 | Asada | ........................... | 322/28 |
| 5,686,819 A * | 11/1997 | Iwatani et al. | ................. | 322/25 |
| 5,694,311 A * | 12/1997 | Umeda et al. | ................. | 363/89 |
| 5,929,613 A * | 7/1999 | Tsuchiya et al. | ............... | 322/58 |
| 6,075,348 A | 6/2000 | Iwatani et al. | ................. | 322/32 |
| 6,140,915 A * | 10/2000 | Iwatani | ........................ | 340/438 |
| 6,734,653 B2 * | 5/2004 | Taniguchi et al. | ............. | 322/24 |
| 6,812,675 B2 * | 11/2004 | Okamoto et al. | .............. | 322/28 |
| 6,815,933 B2 * | 11/2004 | Taniguchi et al. | ............. | 322/28 |
| 6,867,569 B2 * | 3/2005 | Taniguchi et al. | ............. | 322/28 |
| 6,909,262 B2 * | 6/2005 | Yao et al. | ...................... | 322/28 |
| 6,919,712 B1 * | 7/2005 | Kitamura et al. | ............. | 322/59 |
| 6,924,629 B1 * | 8/2005 | Mueller et al. | ................ | 322/28 |
| 6,936,996 B2 * | 8/2005 | Uematsu et al. | .............. | 322/99 |
| 6,937,484 B2 * | 8/2005 | Nakamura et al. | ............ | 363/36 |

* cited by examiner

*Primary Examiner*—Darren Schuberg
*Assistant Examiner*—Pedro J. Cuevas
(74) *Attorney, Agent, or Firm*—Oliff & Berridge, PLC

(57) ABSTRACT

A generator control circuit of an ac generator which charges a battery includes a voltage regulator, a comparator which provides a control signal for controlling the voltage regulator when the output voltage of the ac generator is higher than a predetermined voltage and an alarming device which operates when the comparator does not provide the control signal. The predetermined voltage is set higher than voltage of the battery when the battery is open and equal to or lower than a regulation voltage of the ac generator.

15 Claims, 3 Drawing Sheets

GENERATOR CONTROL CIRCUIT HAVING ALARM CONTROLLER

CROSS REFERENCE TO RELATED APPLICATION

The present application is based on and claims priority from Japanese Patent Applications: 2002-357468, filed Dec. 10, 2002; and 2003-308231, filed Sep. 1, 2003, the contents of which are incorporated herein by reference.

BACKGROUND OF THE INVENTION

1. Field of the Invention

The present invention relates to a generator control circuit of a vehicle ac generator which includes a voltage regulator, an alarm and an alarm controller.

2. Description of the Related Art

The vehicle ac generator generally supplies electric power to a battery and various electric devices which are mounted in a vehicle. For this purpose, the ac generator is equipped with a voltage regulator for regulating the output voltage of the ac generator at a desired level. Such a generator includes an alarm controller which warns a driver of a trouble of the generator such as a breakdown of the field coil thereof by an alarm lamp, as disclosed in JP-A-10-225008 or its counterpart U.S. Pat. No. 6,075,348. The disclosed alarm controller detects one of phase voltages that are generated in a plurality of phase coils. The detected phase voltage is smoothed by a smoothing capacitor to be compared by a comparator, as an input signal, with a threshold voltage. The alarm lamp is turned off to inform the driver of normal operation of the generator if the smoothed voltage is higher than the threshold voltage.

However, if leak current flows from the battery to the phase coils, the voltage of the input signal of the comparator may be high enough to make the alarm lamp turn off although the phase coils do not generate a normal voltage. Therefore, it is necessary to provide an additional circuit which prevents the above problem. For example, the additional circuit controls the smoothing capacitor to be charged only when the frequency of the phase voltages is higher than a preset level. This makes it difficult to reduce the size of the generator.

SUMMARY OF THE INVENTION

In view of the above problems, the object of the invention is to provide an improved compact generator control circuit which includes a voltage regulator and an alarm controller but does not detect a phase voltage of the generator.

According to a main feature of the invention, a generator control circuit of an ac generator for charging a battery includes a voltage regulator, a comparator which provides a first signal when the output voltage of the ac generator is higher than a predetermined voltage, and an alarming means which gives an alarm when the comparator does not provide the first signal. The predetermined voltage is arranged to be higher than voltage of the battery when the battery is open.

With the above generator control circuit, an alarm can be given without detecting a phase voltage of the ac generator. This dispense with means for detecting the phase voltage and its surroundings for supporting it, so that the generator can be made compact at a lower cost.

In the generator control circuit as described above, the comparator may provide the first signal if the output voltage of the ac generator is higher than the regulation voltage, and the voltage regulator includes a first switch connected to the field coil to control current supplied to the field coil when the comparator provides the first signal. The alarming means may includes a holding circuit for holding the alarming means inoperative after the generator is operated and the comparator provides the first signal and a second switch that is controlled by the holding circuit. In the above described generator control circuit the alarming means may include a holding circuit for holding the alarming means inoperative after the generator is operated and the comparator provides the first signal and a second switch controlled by the holding circuit.

With the above arrangement, the alarming means can stop alarming as soon as the generator generates normal voltage after it is driven by an engine.

Further, the above described generator control circuit may include a discrimination circuit connected to the field coil. The discrimination circuit provides a signal for resetting the holding circuit to hold the alarming means operative when field current is not controlled by the first switch irrespective of the first signal. Therefore, a driver can learn of a failure of the generator.

The above described generator control circuit may further include an OFF circuit which temporarily turns off the first switch if the output voltage of the generator becomes lower than the regulation voltage. If the field coil breaks down or is disconnected from the first switch, the discrimination circuit detects the failure and provides a signal to give an alarm to a driver. Preferably, the OFF circuit includes means for cyclically turning off the first switch to control the field current before the engine fully operates.

The OFF circuit may turn off the first switch when the output voltage of the generator becomes higher than a first predetermined voltage that is lower than the regulation voltage and higher than a battery open voltage before the comparator provides the first signal, and turns on the first switch after the comparator provides the first signal if the output voltage of the generator becomes lower than a second voltage that is lower than the first voltage and higher than a battery voltage which is finally discharged. This arrangement is effective to reduce noises caused when various electric loads are connected or disconnected.

The above described OFF circuit may include means for maintaining the first switch to turn off for a first off period until the output voltage of the generator becomes higher than the first predetermined voltage and for a second off period that is shorter than the first off period if the output voltage of the generator becomes lower than the second reference voltage. With this arrangement, the ac generator can provide almost a maximum output power even if the output voltage thereof becomes lower than the second reference voltage.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A generator control circuit according to the first embodiment of the invention is described with reference to FIGS. 1 and 2.

Figure 1:
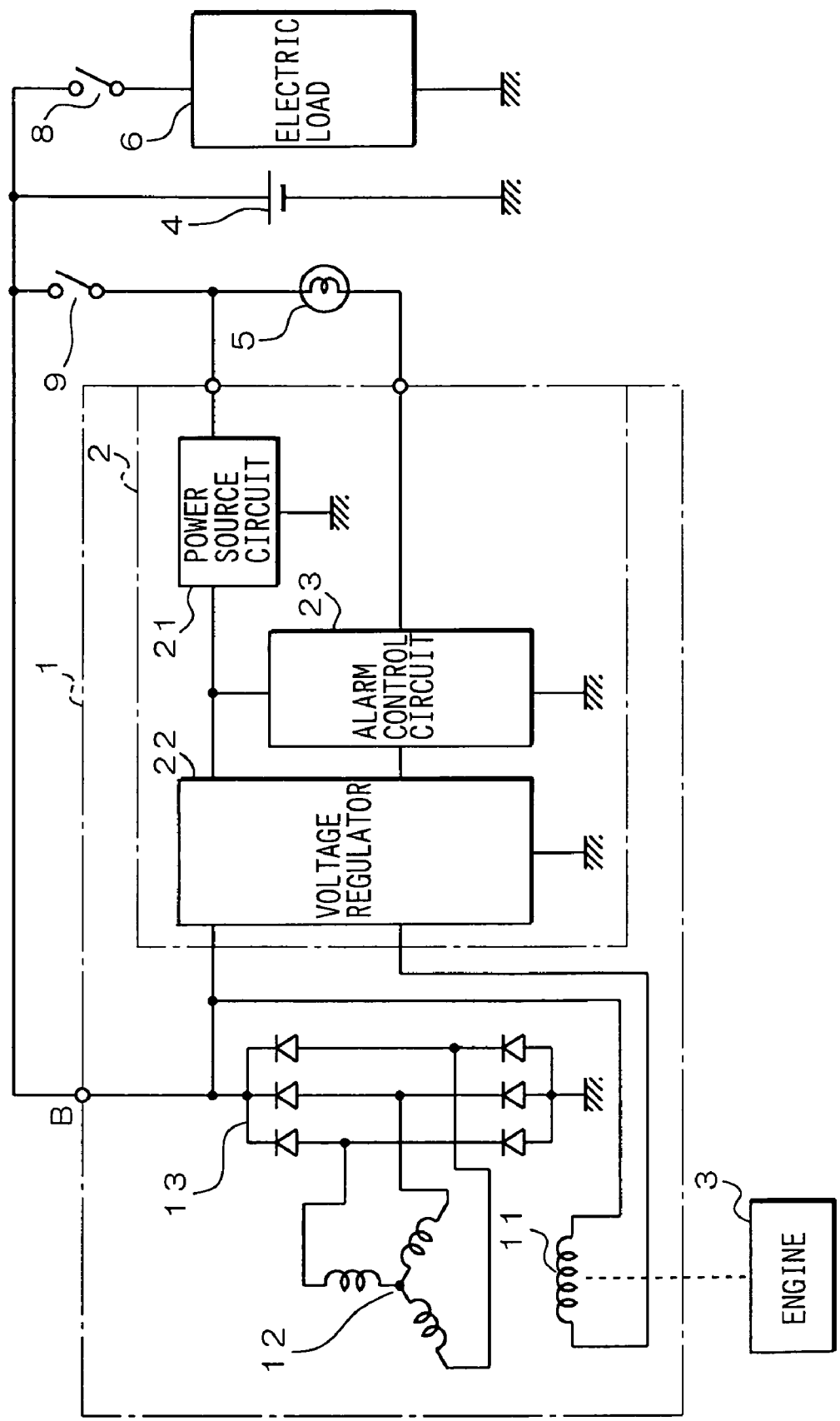
FIG. 1 is a block diagram illustrating a generating system including an ac generator having a generator control circuit according to the first embodiment of the invention, a battery and an electric load.

As shown in FIG. 1, an ac generator includes a field coil 11, an armature winding 12, a rectifier unit 13 and a generator control circuit 2.

The field coil 11 provides a magnetic field when field current is supplied thereto. The field coil 11 is wound around a magnetic core to form a rotor. The armature winding 12 is constituted of a plurality of phase windings (e.g. three phase windings) and wound around an armature core to form an armature. The armature winding 12 generates electric output power when the rotor rotates and the filed coil provides a rotating magnetic field. The output power of the armature winding 12 is rectified by the rectifier unit 13 and supplied to a battery 4 and an electric load 6. The rectifier unit 13 is connected to the electric load 6 via a switch 8 and to an alarm lamp 5 via a switch 9.

The ac generator 1 is driven by an engine, and the output voltage thereof changes as the rotation speed of the engine changes when the field current is supplied to the field coil 11. The amount of the field current is controlled by a voltage regulator 22 included in the generator control circuit 2.

The generator control circuit 2 also includes a power source circuit 21 and an alarm control circuit 23. The power source circuit 21 provides drive voltage (power voltage) after the switch turns on. The switch 9 is operated when an ignition key is operated. When a key switch is inserted to a key hole and turned in a preset direction, the switch 9 is turned on first and a starter switch is subsequently turned on to start the engine. The voltage regulator 22 controls the field current supplied to the field coil 11 to regulate the output voltage of the generator 1 to a predetermined regulation voltage. The alarm control circuit 23 turns on the alarm lamp 5 when the ignition key is operated and turns off the same when the voltage regulator 22 provides a reset signal. The electric load 6 is energized when the switch 8 is turned on by the driver. The electric load 6 includes an air conditioner and various lamps.

Figure 2:
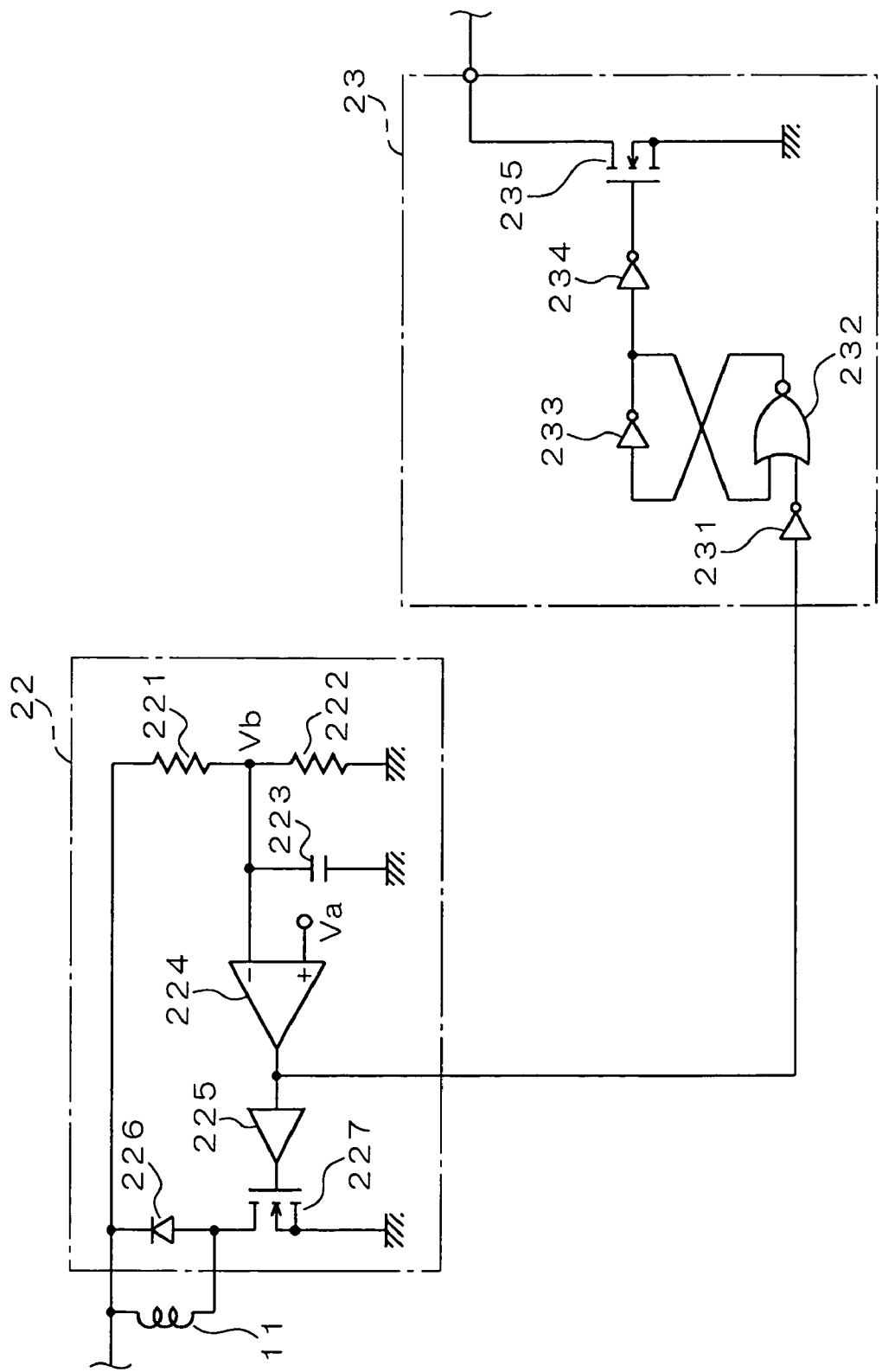
FIG. 2 is a circuit diagram of the generator control circuit illustrated in FIG. 1.

As shown in FIG. 2, the voltage regulator 22 is constituted of resistors 221, 222, a capacitor 223, a voltage comparator 224, a drive circuit 225, a fly wheel diode 226 and a switch 227. The comparator 224 has a positive terminal to which reference voltage Va is applied and a negative terminal to which divided voltage Vb which is a portion of the output voltage of the ac generator 1 divided by the resistors 221, 222. The reference voltage Va equals to the divided voltage Vb when the output voltage becomes lower than the regulation voltage of the ac generator 1 and higher than the battery open voltage which is a voltage of the battery when the battery is open or disconnected from any electric load. The capacitor 223 removes noises included in the input voltage Vb. Usually, the output voltage of the ac generator 1 contains high frequency noises (e.g. ignition noise, ripples and switching noises), and a parallel circuit of the resistor 222 and the capacitor 223 removes such noises and provides a delay time to stabilize the switching operation of the switch 227. The output signal of the comparator 224 is inputted to the drive circuit 225.

The drive circuit 225 drives the switch 227, which is constituted of a power MOSFET. The switch 227 has a gate connected to the output terminal of the drive circuit 225, a drain connected via the diode 226 to an output terminal of the ac generator 1 and a grounded source. The drain of the switch 227 is also connected to the field coil 11. When the switch 227 is turned on, field current is supplied to the field coil 11. On the other hand, the field current supply is stopped when the switch 227 is turned off.

The flywheel diode 226 is connected in parallel with the field coil 11 so as to pass the field current through the diode 226 when the switch 227 is turned off. The alarm control circuit 23 is constituted of inverting circuit 231, 233, 234, a NOR circuit 232 and a switch 235. The inverting circuit 231 has an input terminal connected to the output terminal of the comparator 224. The NOR circuit 232 has a pair of input terminals one of which is connected to the output terminal of the inverting circuit 231 and the other of which is connected to the output terminal of the inverting circuit 233 and an output terminal connected to the input terminal of the inverting circuit 233. The output terminal of the inverting circuit 233 is also connected to the input terminal of the inverting circuit 234.

When the ignition key is operated to turn on the switch 9, the power source circuit 21 starts to supply power to the voltage regulator 22 and the alarm control circuit 23.

In the voltage regulator 22 before the engine starts, the reference voltage Va that is applied to the positive terminal of the comparator 224 is higher than the input voltage Vb that is applied to the negative terminal of the comparator 224. Therefore, the comparator 224 provides a high level signal, and the drive circuit 225 turns on the switch 227. Consequently, field current is supplied to the field coil 11.

In the alarm control circuit 23 at the same time, the high level signal is inputted from the comparator 224 to the inverting circuit 231, which provides a low level signal. This is supplied to one of the input terminals of the NOR circuit 232. The other input terminal of the NOR circuit 232 is supplied with a low level signal just after the power source circuit starts. For this purpose, the impedance of the NOR circuit 232 is arranged to be lower than the impedance of the inverting circuit 233. Thus, low level signals are applied to both the input terminals of the NOR circuit 232, so that the NOR circuit 232 provides a high level output signal. Accordingly, the inverting circuit 233 maintains a low level output signal, which stabilizes the operation of the NOR circuit.

The low level signal provided by the inverting circuit 233 is also inputted to the inverting circuit 234, which inverts it to a high level signal to turn on the switch 235, thereby operating the alarm lamp 5.

After the engine starts and the field coil 11 rotates to provide the rotating magnetic field, the armature winding 12 generates ac voltage, which is rectified by the rectifier unit 13 to provide dc power to be supplied to the battery and, through the switch 8, to the electric load 6.

Thereafter, the output voltage of the ac generator 1 increases. If the input signal voltage Vb of the negative terminal of the comparator 224 of the voltage regulator 22 becomes higher than the reference voltage Va of the positive terminal, the comparator 224 changes its output signal from a high level signal to a low level signal. Accordingly, the switch 227 is turned off, and the field current supplied to the field coil 11 reduces, lowering the output voltage of the ac generator 1. When, the input signal voltage Vb, thereafter, becomes lower than the reference voltage Va, the comparator 224 changes its output signal from a low level signal to a high level signal. Accordingly, the switch 227 is turned on again, and the field current supplied to the field coil 11 increases to increase the output voltage of the ac generator 1. Thus, the output voltage of the ac generator 1 is regulated to a desired regulation voltage.

Meanwhile, when the comparator 224 changes its output signal from a high level signal to a low level signal, the inverting circuit 231 of the alarm control circuit 23 changes its output signal from a low level signal to a high level signal, the NOR circuit 232 changes its output signal from a high level signal to a low level signal. Therefore, the inverting circuit 233 provides a high level output signal, so that the inverting circuit 234 provides a low level output signal to turn off the switch 235, thereby turning off the alarm lamp 5.

When the NOR circuit 232 provides a low level signal, a high level output signal of the inverting circuit 233 is also inputted to one of the input terminals of the NOR circuit 232. Therefore, the NOR circuit 232 maintains its low level output signal irrespective of the signal inputted to the other input terminal. Accordingly, the switch 235 holds the alarm lamp 5 in turning off until the power source circuit 21 stops its operation.

Thus, it is not necessary to detect a voltage induced in one of the phase windings of the armature winding 12.

A driver can readily learn a problem from the alarm lamp 5 after the engine starts so that he or she can deal with such a problem. For example, the alarm lamp 5 is not turned off in a short time, if the electric load is too heavy, if the generator stops generation due to cutting of a generator driving belt, or if a battery badly deteriorates.

A generator control circuit 2A according to the second embodiment of the invention, which is to be substituted for the generator control circuit 2 shown in FIG. 1, is described with reference to FIG. 3. Incidentally, the same reference numeral as the first embodiment indicates the same or substantially the same portion, part or component as the first embodiment.

Figure 3:
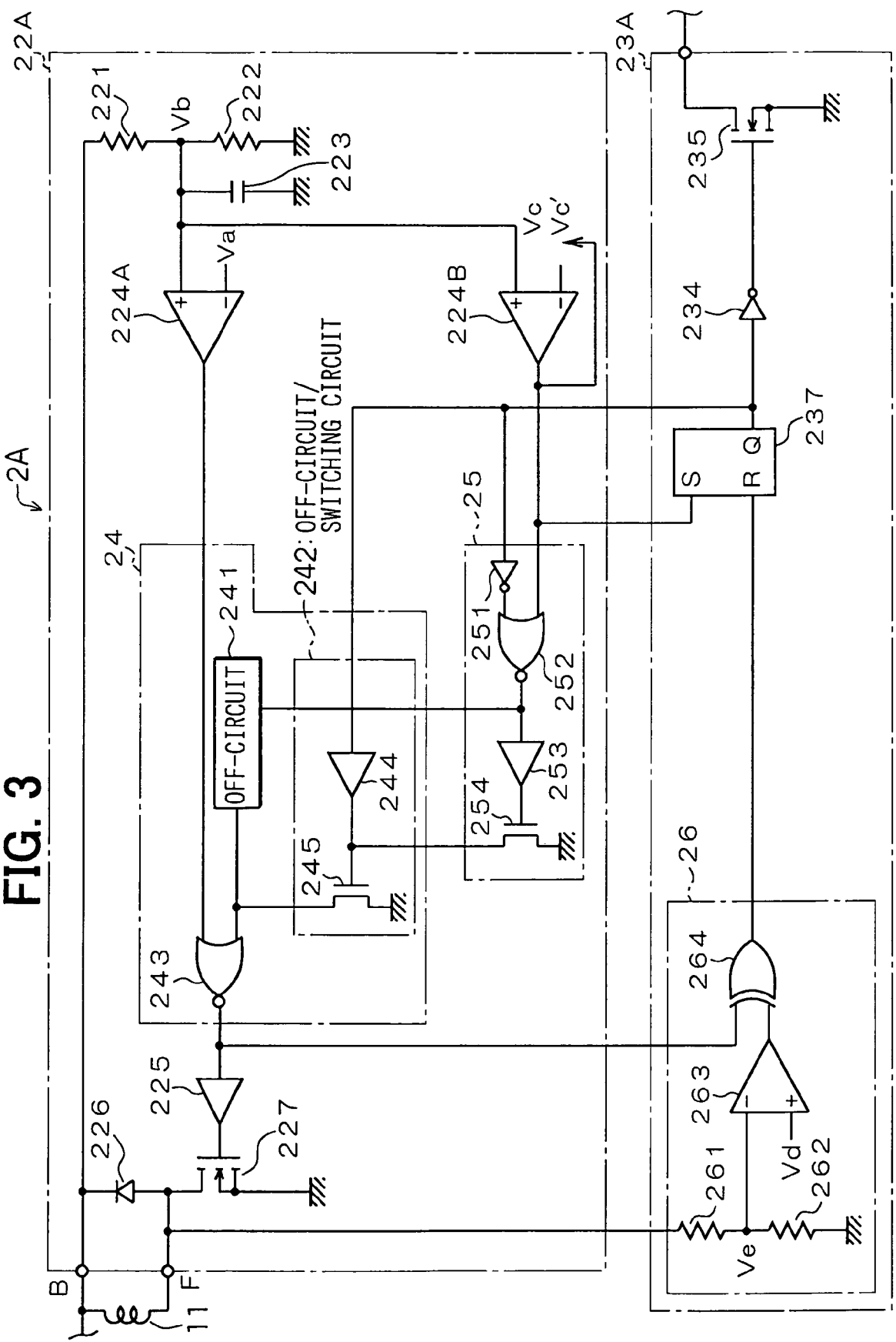
FIG. 3 is a circuit diagram of a generator control circuit according to the second embodiment of the invention.

As shown in FIG. 3, the generator control circuit 2A is constituted of a voltage regulator 22A and an alarm control circuit 22B. The voltage regulator 22A includes resistors 221, 222, a capacitor 223, a voltage comparator 224A, a drive circuit 225, a flywheel diode 226, a switch 227, anther voltage comparator 224B, an output control signal setting circuit 24 and an off-time control circuit 25.

The comparator 224A has a negative terminal to which reference voltage Va is applied and a positive terminal to which input voltage Vb is applied. The input voltage Vb is a portion of the output voltage divided by resistors 221, 222. The comparator 224A provides a high level output signal when the input voltage Vb is higher than the reference voltage Va.

The comparator 224B has a negative terminal and a positive terminal. The negative terminal is applied a first reference voltage Vc and a second reference voltage Vc', and the positive terminal is applied the same input voltage Vb as the first comparator. The first reference voltage Vc corresponds to the generator output voltage that is lower than the regulation voltage and higher than the battery open voltage, and the second reference voltage Vc' is lower than the regulation voltage and higher than the voltage of the fully discharged battery. The second reference voltage Vc' has a basic voltage that corresponds to the first predetermined voltage Vc and a hysteresis added thereto. The second comparator 224B provides a high level output signal when the input voltage Vb is higher than the reference voltage Vc or Vc'.

The output control signal setting circuit 24 includes an OFF circuit 241, an off-circuit switching circuit 242 and a NOR circuit 243. The NOR circuit 243 has one of the input terminals connected to the output terminal of the first comparator 224A, the other input terminal connected to the output terminal of the OFF circuit 241 and an output terminal connected to the drive circuit 225. The OFF circuit 241 temporarily or cyclically provides a high level signal to temporarily turn off the switch 227.

The off-circuit switching circuit 242 has a buffer 244 and a transistor 245. The buffer 244 has an input terminal connected to Q terminal of an RS flip flop circuit 237 of the alarm control circuit 23A and an output terminal connected to a gate of the transistor 245. The transistor 245 has a drain connected to a joint connecting the OFF circuit 241 and the NOR circuit 243.

The off-time control circuit 25 includes an inverting circuit 251, a NOR circuit 252, a buffer 253 and a transistor 254. The NOR circuit 252 has one of input terminals connected to output terminal of the second comparator 224B and the other input terminal connected, via an inverting circuit 251, to Q terminal of the RS flip flop circuit 237. The output terminal of the NOR circuit 252 is connected to the gate of the transistor 254 via the buffer 253 and directly to the OFF circuit 241. The transistor 254 has a drain connected to the output terminal of the buffer 244 of the off-circuit switching circuit 242.

The alarm control circuit 23A includes an inverting circuit 234, a switch 235, a discrimination circuit 26, and the RS flip flop circuit 237.

The discrimination circuit 26 includes resistors 261, 262, a voltage comparator 263 and an exclusive OR circuit 264. The voltage comparator 263 has one of a pair of input terminals to which voltage Vd is applied and the other input terminal to which voltage Ve is applied. The voltage Ve is a portion of a voltage level of a junction (or a terminal F of the field coil) connecting the field coil 11 and the switch 227 divided by the resistors 261 and 262. The comparator 263 provides a high level output signal when the voltage Ve becomes lower than the reference voltage Vd. The exclusive OR circuit 264 has one of a pair of input terminals to which the output signal of the comparator 263 is inputted and the other input terminal to which the output signal of the output control signal setting circuit 24 to be inputted to the drive circuit 225 is also inputted. The output signal of the exclusive OR circuit 264, as the output signal of the discrimination circuit 26, is inputted to R terminal of the flip flop circuit 237. The RS flip flop circuit 237 is connected to the discrimination circuit 26 at R terminal, to output terminal of the second comparator 224B at S terminal and to the input terminal of the inverting circuit 234, which drives the switch 235, at Q terminal.

When an ignition key is operated to turn on the switch 9, the power source circuit 21 starts its operation, so that the voltage regulator 22A and various elements in the alarm control circuit 23A respectively start their operation.

Before the engine operates, the reference voltage Va that is applied to the first voltage comparator 224A of the voltage regulator 22A is higher than the input voltage Vb. Therefore, the comparator 224A provides a low level output signal to increase the field current. Meanwhile, the second voltage comparator 224B provides a low level output signal because the reference voltage Vc is higher than the input voltage Vb.

The flip flop circuit 237 of the alarm control circuit 23A provides a low level output signal at Q terminal because a low level input signal is applied to S terminal. At the same time, the OFF circuit 241 cyclically provides a high level signal to reduce the field current, and the NOR circuit 243 provides a pulse signal the duty ratio of which changes according to a combination of the output signal of the first comparator 224A and the output signal of the OFF circuit 241. The drive circuit 225 turns on or off the switch 227 according to the pulse signal provided by the NOR circuit 243. Thus, supply of the field current to the field coil 11 starts. Meanwhile, in the alarm control circuit 23A, Q terminal of the RS flip flop circuit 237 provides a low level signal, and the inverting circuit 234 provides a high level signal to turn on the switch 235, thereby turning on the alarm lamp 5.

When the engine has started, and the field coil rotates to generate the rotating magnetic field, the armature winding 12 generates ac voltage, which is rectified by the rectifier unit 13 to be supplied to the battery 4 and the electric load 6 through the switch 8.

Thereafter, the output voltage of the ac generator 1 increases. If the input signal voltage Vb applied to the positive terminal of the comparator 224B of the voltage regulator 22 becomes higher than the reference voltage Vc (i.e. 14 V for the corresponding output voltage) applied to the negative terminal, the comparator 224B changes its output signal from a low level signal to a high level signal. Q terminal of the RS flip flop circuit 237 changes its output signal from a low level signal to a high level signal. Accordingly, the inverting circuit 234 provides a low level output signal to turn off the switch 235. Thus, the alarm lamp 5 is turned off. When Q terminal of the RS flip flop circuit 237 provides a high level signal, the transistor 245 of the off-circuit switching circuit 242 is turned on, so that the output terminal of the OFF circuit 241 is grounded. That is, the output terminal of the OFF circuit provides a low level signal. Accordingly, the NOR circuit 243 provides a high level output signal to turn on the switch 227, so that the field coil 11 is fully excited to make the ac generator 1 generate a full electric power.

Incidentally, it would be possible to gradually increase the field current to make the generator 1 gradually generate power when a high level signal is provided by Q terminal of the flip flop circuit 237. In this case, increase of the generator driving torque can be moderated so that a smooth operation of the engine can be ensured.

If the output voltage of the generator 1 increase further (e.g. to 14.5 V), and the input voltage Vb becomes higher than the reference voltage Va, the output signal of the comparator 224A changes from a low level signal to a high level signal. Accordingly, thethe NOR circuit 243 provides a low level signal. As a result, the switch 227 is turned off, the field current decreases, and the output voltage of the generator 1 lowers.

When the input voltage Vb of the positive input terminal of the comparator 224A becomes lower than the reference voltage Va, the switch 227 is turned on again, and the field current supplied to the field coil 11 increases to increase the output voltage of the ac generator 1. Thus, the output voltage of the ac generator 1 is regulated to a desired voltage level.

If the switch 227 fails to control the field current by accident such as short-circuiting between the drain and source, the following operation will be carried out.

If the input voltage Vb becomes higher than the reference voltage Va, the comparator 224A provides a high level output signal, and the NOR circuit 243 provides a low level signal. However, because the switch 227 fails and keeps turning on, the terminal F is grounded. Accordingly, the voltage Ve, which is a portion of a voltage level of the terminal F of the field coil divided by the resistors 261 and 262 of the discrimination circuit 26, becomes lower than the reference voltage Vd, so that the comparator 263 provides a high level signal. The exclusive OR circuit 264 receives this high level signal and a low level signal from the NORcirduit 243 of the output control signal setting circuit 24 and provides a high level signal.

When the RS flip flop circuit 237 receives this high level signal at R terminal, Q terminal changes its output signal from a high level signal to a low level signal. As a result, the output terminal of the inverting circuit 234 provides a high level signal to turn on the switch 235 to thereby operate the alarm lamp 5.

Incidentally, it is possible to detect the failure of the switch 227 according to a combination of the signal inputted to the gate of the switch 227 and an amount of current supplied to the field coil from the switch 227. It is also possible to provide R terminal of the RS flip flop circuit 237 with a signal to turn on the alarm lamp 5 if the discrimination circuit 26 detects uncontrollable opening of the switch 227 or short circuiting of the field coil. In this case, a protection circuit which protects the switch 227 from abnormally large short circuit current may be provided.

If the field coil 11 breaks down, the generator 1 does not generate normal output voltage. Therefore, the input voltage Vb of the comparator becomes lower than the reference voltage Va, so that the NOR circuit 243 receives a low level signal from it. Accordingly, the NOR circuit 243 provides a high level signal, and the switch 227 is turned on. The input voltage Ve of the comparator 263 becomes lower than the reference voltage Vd, so that the comparator 263 provides a high level output signal. Consequently, the exclusive OR circuit 264 receives high level signals at both input terminals thereof and provides R terminal of the RS flip flop circuit 237 with a low level signal, which does not reset the RS flip flop circuit 237.

When the output voltage of the generator 1 further lowers, the input voltage Vb of the comparator 224B becomes lower than the reference voltage Vc' (i.e. 12 V for the corresponding output voltage). Accordingly, the comparator 224B provides a low level output signal.

After the generator 1 has operated, the RS flip flop circuit 237 provides a high level output signal at Q terminal. Therefore, the transistor 245 turns on, so that the OFF circuit 241 maintains a low level output signal. Since the inverting circuit 251 of the off-time control circuit 25 provides a low level output signal, the NOR circuit 252 provides a high level output signal to turn on the transistor 254. Accordingly, the transistor 245 of the off-circuit switching circuit 242 is turned off, so that the OFF circuit 241 provides a high level output signal.

Consequently, the NOR circuit 243 provides a low level signal to turn off the switch 227. However, the input signal Ve of the comparator 263 is lower than the reference voltage Vd because the field coil 11 does not supply a bias voltage. Thus, the comparator 263 maintain a high level output signal. Accordingly, the exclusive OR circuit 264 provides a high level output signal or a reset signal. When the reset signal is inputted to R terminal of the flip flop circuit 237, it is reset and provides a low level signal at Q terminal. As a result, the inverting circuit 234 provides a high level output signal to turn on the switch 235, and the alarm lamp 5 turns on.

The off-time period can be changed when the NOR circuit 252 of the off-time control circuit 25 provides a high level output signal. The OFF circuit 241 provides a first pulse signal the on-duty ratio of which is several tens of % to control the switch 227 to conduct the initial field exciting current until the input voltage Vb of the comparator 224B becomes higher than the reference voltage Vc. This arrangement suppresses an excessive amount of the initial field current.

When the input voltage Vb of the comparator 224B becomes lower than the reference voltage Vc' after it has become lower than the reference voltage Vc, the OFF circuit 241 provides a second pulse signal the on-duty ratio of which is larger than the first pulse signal (off-duty ratio of which is several %). Thus, the input terminal of the comparator 224B has the hysteresis, so that it can absorb noises due to a voltage drop in a normal operation, such as turning on of an electric load.

As a result, it is possible to give an alarm to the driver without affecting the output power of the generator 1. Incidentally, the alarm lamp can be substituted by any other alarming device, such as a buzzer or the like.

If the generator 1 is connected to an electric load, such as a heater for a catalyser which is operable under much higher voltage, such as 30 V, than the battery voltage, the initial field current, which is much larger than the field current without catalyser, can be suppressed by providing a field current suppressing circuit. In this case, the field current is compared with a maximum reference value by a comparator. If the field current becomes as large as the maximum reference value, the field current suppressing circuit provides a signal to turn off the switch 227 to circulate the field current through the flywheel diode for a period of milli seconds, which is shorter than a period determined by the time constant of the field coil. Thereafter, the switch 227 is turned on until the field current becomes as large as the maximum reference value, and the above control is repeated.

It is possible to provide a temperature sensor to operate the field current suppressing circuit only if an ambient temperature is lower than a predetermined low temperature (e.g. 0° C.) because the field current increases as the resistance of the field coil decreases at a lower temperature.

If the field current exceeds a predetermined amount when the ambient temperature becomes lower, the field current suppressing circuit provides a signal to increase time in which the field current is gradually increased. On the other hand, the field current suppressing circuit provides no signal, so that the transient time for gradually increasing the field current becomes shorter. Thus, generation controlling transient time during the engine starting can be changed according to the ambient temperature.

If the output voltage of the generator 1 becomes as high as a regulation voltage after the field current suppressing circuit provides a signal to suppress the field current, the generator control transient time may be canceled. Accordingly, the generator controlling transient time may be made longer when the engine is being started and shorter after the engine fully operates. This can maintain the battery voltage at a high level and enhance engine-starting performance.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A generator control circuit of an ac generator for charging a battery which includes a field coil, said generator control circuit comprising:

a voltage regulator for regulating an output voltage of said ac generator to a regulation voltage, a comparator for providing a first signal when the output voltage of the ac generator is equal to or lower than the regulation voltage and higher than a predetermined voltage which is higher than voltage of said battery when said battery is open;

means for alarming when said comparator does not provide the first signal; and a discrimination circuit connected to the field coil, wherein:

said voltage regulator comprises a first switch having an output terminal connected to the field coil;

the predetermined voltage of said comparator is equal to the regulation voltage so that said comparator provides a regulation voltage signal to turn on or off said first switch to control current supplied to the field coil when the output voltage becomes higher than the regulation voltage;

the first signal is formed from the regulation voltage; and said discrimination circuit provides a signal for resetting said holding circuit to hold said alarming means operative if field current is not controlled by said first switch irrespective of the first signal.

2. The generator control circuit as claimed in claim 1, wherein said alarming means comprises a holding circuit for holding said alarming means inoperative after the generator is operated and said comparator provides the first signal and a second switch controlled by said holding circuit.

3. The generator control circuit as claimed in claim 1, further comprising an OFF circuit for temporarily turning off the first switch if the output voltage of the generator becomes lower than the predetermined voltage.

4. The generator control circuit as claimed in claim 3, wherein said OFF circuit comprises means for cyclically turning off said first switch.

5. The generator control circuit as claimed in claim 3, wherein said OFF circuit turns off the first switch when the output voltage of the generator becomes higher than a first predetermined voltage that is lower than the regulation voltage and higher than a battery open voltage before said comparator provides the first signal, and turns on the first switch after said comparator provides the first signal if the output voltage of the generator becomes lower than a second voltage that is lower than the first voltage and higher than a battery voltage which is finally discharged.

6. The generator control circuit as claimed in claim 5, wherein said OFF circuit comprises means for maintaining said first switch to turn off for a first off period until the output voltage of the generator becomes higher than the first predetermined voltage and for a second off period that is shorter than the first off period if the output voltage of the generator becomes lower than the second reference voltage.

7. A generator control circuit of an ac generator for charging a battery which includes a field coil, said generator control circuit comprising:

output control means for providing a first control signal to reduce current supplied to the field coil when the output value of the generator is higher than a regulation value and a second control signal to increase the current supplied to the field coil when the output value of the generator is lower than the regulation value;

control switching means for maintaining a first control operation until said output control means provides the first control signal and changing from the first control operation to a second control operation when said output control means provides the second control signal, said control switching means including holding means for holding said second control operation after said output control means provides the first control signal; and a discrimination circuit, connected to the field coil, for providing a signal for resetting said holding means to hold said alarming means operative if field current is not controlled by said first switch irrespective of the first signal.

8. The generator control circuit as claimed in claim 7, wherein said output control means comprises a first comparator which compares the output value of the generator with the regulation value, and said control switching means comprises a first switch which controls field current supplied to the field coil according to an output signal of said first comparator.

9. The generator control circuit as claimed in claim 7, further comprising a second comparator for comparing the field current with a reference value and an OFF circuit which provides an output signal to control said first switch for a predetermined period.

10. The generator control circuit as claimed in claim 7, wherein said control switching means comprises a second switch which operates according to a condition of said holding means.

11. A generator control circuit of an ac generator for charging a battery which includes a field coil, said generator control circuit comprising:

a voltage regulator for regulating an output voltage of said ac generator to a regulation voltage, said voltage regulator including a first switch having an output terminal connected to the field coil;

a comparator for providing a first signal when the output voltage of the ac generator is equal to or lower than the regulation voltage and higher than a predetermined voltage which is higher than voltage of said battery when said battery is open;

means for alarming when said comparator does not provide the first signal; and a discrimination circuit connected to the field coil, wherein:

said alarming means comprises a holding circuit for holding said alarming means inoperative after the generator is operated and said comparator provides the first signal and a second switch controlled by said holding circuit; and said discrimination circuit provides a signal for resetting said holding circuit to hold said alarming means operative if field current is not controlled by said first switch irrespective of the first signal.

12. The generator control circuit as claimed in claim 11, further comprising an OFF circuit for temporarily turning off the first switch if the output voltage of the generator becomes lower than the predetermined voltage.

13. The generator control circuit as claimed in claim 12, wherein said OFF circuit comprises means for cyclically turning off said first switch.

14. The generator control circuit as claimed in claim 12, wherein said OFF circuit turns off the first switch when the output voltage of the generator becomes higher than a first predetermined voltage that is lower than the regulation voltage and higher than a battery open voltage before said comparator provides the first signal, and turns on the first switch after said comparator provides the first signal if the output voltage of the generator becomes lower than a second voltage that is lower than the first voltage and higher than a battery voltage which is finally discharged.

15. The generator control circuit as claimed in claim 14, wherein said OFF circuit comprises means for maintaining said first switch to turn off for a first off period until the output voltage of the generator becomes higher than the first predetermined voltage and for a second off period that is shorter than the first off period if the output voltage of the generator becomes lower than the second reference voltage.

* * * * *